United States Patent
Henriksen et al.

(10) Patent No.: US 9,639,353 B1
(45) Date of Patent: May 2, 2017

(54) COMPUTING QUALITY METRICS OF SOURCE CODE DEVELOPERS

(71) Applicant: SEMMLE LIMITED, Oxford (GB)

(72) Inventors: Anders Starcke Henriksen, Oxford (GB); Galen Menzel, Black Mountain, NC (US)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/269,730

(22) Filed: Sep. 19, 2016

(51) Int. Cl.
*G06F 9/44* (2006.01)
*G06F 3/0481* (2013.01)
*G06F 17/22* (2006.01)
*G06T 11/20* (2006.01)

(52) U.S. Cl.
CPC .............. *G06F 8/77* (2013.01); *G06F 3/0481* (2013.01); *G06F 9/4443* (2013.01); *G06F 17/2288* (2013.01); *G06T 11/206* (2013.01); *G06T 2200/24* (2013.01)

(58) Field of Classification Search
CPC ........ G06F 3/0481; G06F 8/77; G06F 9/4443; G06F 17/2288; G06T 11/206; G06T 2200/24
USPC .................. 717/100–103, 105, 109, 113, 125
See application file for complete search history.

(56) References Cited

U.S. PATENT DOCUMENTS

| | | | |
|---|---|---|---|
| 5,917,500 A | 6/1999 | Johnson et al. | |
| 5,917,730 A | 6/1999 | Rittie et al. | |
| 6,226,787 B1 | 5/2001 | Serra et al. | |
| 7,174,536 B1 | 2/2007 | Kothari et al. | |
| 7,505,952 B1* | 3/2009 | Engler | G06F 11/3616 706/47 |
| 7,904,802 B1* | 3/2011 | Kolawa | G06Q 10/06 705/300 |
| 8,336,030 B1 | 12/2012 | Boissy | |
| 2006/0123389 A1 | 6/2006 | Kolawa et al. | |
| 2006/0136863 A1 | 6/2006 | Szpak | |
| 2006/0276995 A1* | 12/2006 | Breitgand | H04L 12/24 702/179 |

(Continued)

FOREIGN PATENT DOCUMENTS

EP  2784665  10/2014

OTHER PUBLICATIONS

Gousios et al., "Measuring Developer Contribution from Software Repository Data," May 2008, ACM, p. 129-132.*

(Continued)

*Primary Examiner* — Qing Chen
(74) *Attorney, Agent, or Firm* — Fish & Richardson P.C.

(57) ABSTRACT

Methods, systems, and apparatus, including computer programs encoded on computer storage media, for evaluating source code developers. One of the methods includes receiving, from a user, a request for a user interface presentation representing an overall performance metric versus a second metric attributed to each responsible entity of a plurality of responsible entities that contributed source code to a project. A user interface presentation is generated, wherein each responsible entity is represented by a graphical element at a position in a display area, the position of the element having one coordinate corresponding to the first measure of the overall contributions contributed by the responsible entity and another coordinate corresponding to the second measure of the second metric attributed to the responsible entity.

29 Claims, 5 Drawing Sheets

(56) References Cited

U.S. PATENT DOCUMENTS

| | | | |
|---|---|---|---|
| 2006/0293777 A1* | 12/2006 | Breitgand | H04L 12/24 700/108 |
| 2007/0044075 A1* | 2/2007 | Koning | G06F 8/70 717/122 |
| 2010/0050155 A1* | 2/2010 | Iwama | G06F 11/3604 717/120 |
| 2011/0283270 A1 | 11/2011 | Gass et al. | |
| 2011/0320242 A1* | 12/2011 | Cohen | G06Q 10/10 705/7.42 |
| 2012/0324416 A1* | 12/2012 | Lehner | G06F 11/3604 717/101 |
| 2013/0305224 A1 | 11/2013 | Eade et al. | |
| 2014/0258351 A1 | 9/2014 | Laron | |

OTHER PUBLICATIONS

Avgustinov et al., "Tracking Static Analysis Violations Over Time to Capture Developer Characteristics," May 2015, IEEE, p. 437-447.*
Ayewah et al., "Using Static Analysis to Find Bugs", IEEE Software, vol. 25, No. 5, 2008, 8 pages.
Boogerd et al., "Evaluating the Relation Between Coding Standard Violations and Faults Within and Across Software Versions", Delft University of Technology, Software Engineering Research Group, Technical Report Series, Aug. 2009, 14 pages.
Hunt et al., "A Fast Algorithm for Computing Longest Common Subsequences", Communications of the ACM, vol. 20, No. 5, May 1977, 4 pages.
Johnson et al., "Why Don't Software Developers Use Static Analysis Tools to Find Bugs?" ICSE, 2013, 10 pages.
Kim et al., "Program Element Matching for Multi-Version Program Analyses", MSR, May 2006, 7 pages.
Kim et al., "Which Warnings Should I Fix First?", ESEC-FSE, Sep. 2007, 10 pages.
Kim et al., "When Functions Change Their Names: Automatic Detection of Origin Relationship", WCRE, 2005, 10 pages.
Komondoor et al., "Using Slicing to Identify Duplication in Source Code", SAS, 2001, 18 pages.
Myers, "An O(ND) Difference Algorithm and Its Variations", *Algorithmica*, 1986, 15 pages.
Nagappan et al., "Static Analysis Tools as Early Indicators of Pre-Release Defect Density", ICSE, 2005, 8 pages.
Olague et al., "Empirical Validation of Three Software Metrics Suites to Predict Fault-Proneness of Object-Oriented Classes Developed Using Highly Iterative or Agile Software Development Processes", IEEE TSE, vol. 33, No. 6, 2007, 18 pages.
Śliwerski et al, "When Do Changes Induce Fixes?", MSR, May 2005, 5 pages.
Spacco et al., "Tracking Defect Warnings Across Versions", MSR, May 2006, 4 pages.
Subramanyam et al., "Empirical Analysis of CK Metrics for Object-Oriented Design Complexity: Implications for Software Defects", IEEE TSE, vol. 29, No. 4, 2003, 14 pages.
Vetró, "Using Automatic Static Analysis to Identify Technical Debt", ICSE, 2012, 3 pages.
Vetró et al., "An Empirical Validation of FindBugs Issues Related to Defects", 15th Annual Conference on Evaluation & Assessment in Software Engineering (EASE), Apr. 2011, 11 pages.
Zheng et a., "On the Value of Static Analysis for Fault Detection in Software", IEEE TSE, vol. 32, No. 4, 2006, 14 pages.
European Search Report in EP Application No. 15164947.2, dated Sep. 10, 2015, 11 pages.
Palix et al., "Tracking code patterns over multiple software versions with herodotos," Proceedings of the eighth Internataionl Conference on Aspect-Oriented Software Development, AOSD '10, Mar. 2010, pp. 169-180.

\* cited by examiner

COMPUTING QUALITY METRICS OF SOURCE CODE DEVELOPERS

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot, e.g., the author of the snapshot, and data about ancestor commits of the node in the revision graph. An author of a snapshot may be an individual, but generally the author will be an entity, e.g., a named group of people or a unit of a company, or some other identifiable developer of software. A directed edge from a first node to a second node in the revision graph indicates that a commit represented by the first node is an immediately preceding commit to a commit represented by the second node, i.e., that no intervening commits exist in the version control system.

SUMMARY

This specification describes how a static analysis system can generate interactive user interface presentations for evaluating source code developers. A system can use matching violations between a snapshot S of a source code base and a snapshot T of the source code base to attribute, to responsible entities, violations introduced and removed between the snapshots S and T. From the violations introduced and removed, the system can generate interactive user interface presentations that provide information characterizing the productivity and quality of responsible entities.

In general, one innovative aspect of the subject matter described in this specification can be embodied in methods that include the actions of receiving, from a user, a request for a user interface presentation representing an overall performance metric versus a second metric attributed to each responsible entity of a plurality of responsible entities that contributed source code to a project; obtaining data representing a respective amount of overall contributions contributed by each responsible entity to the project; computing, for each responsible entity, a first measure of the overall contributions contributed by the responsible entity to the project; computing, for each responsible entity, a second measure of a second metric attributed to the responsible entity; generating the user interface presentation, wherein each responsible entity is represented by a graphical element at a position in a display area, the position of the element having one coordinate corresponding to the first measure of the overall contributions contributed by the responsible entity and another coordinate corresponding to the second measure of the second metric attributed to the responsible entity; providing the user interface presentation for display to the user in response to the request. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The overall performance metric is churn contributed by the responsible entity. The overall performance metric is net code additions by the responsible entity. The second measure of the second metric is a measure of net new violations that represents a difference between (i) how many violations were introduced into snapshots of the project by the responsible entity, and (ii) how many violations introduced by any entity were found in a first snapshot and removed by the responsible entity in a second snapshot. The actions include obtaining respective counts of violation status changes attributed to each responsible entity that were contributed to the project, wherein a violation status change represents a violation introduction attributed to the responsible entity or a violation removal attributed to the responsible entity. The actions include upon receiving a user selection, within the user interface presentation, of a particular representation of a particular responsible entity, displaying a second user interface presentation that displays net new violations over time. The second user interface presentation displays a relationship between (1) net new violations introduced over time and (2) overall contributions over time for the particular responsible entity. The actions include receiving a user selection of the particular representation of the particular responsible entity; and in response to receiving the user selection, generating the second user interface presentation including displaying a first representation of overall contributions over time and a second representation of net new violations over time. The first representation of overall contributions over time and the second representation of net new violations introduced over time are aligned along a time axis. Net new violations for a responsible entity are total violation introductions attributed to the responsible entity minus total violation removals attributed to the responsible entity. Violations removed are violations that occurred in a first snapshot committed by the responsible entity that did not match any violations occurring in a subsequent snapshot of a revision graph. Violations introduced are violations that occurred in a first snapshot committed by the responsible entity that did not match any violations occurring in a preceding snapshot of a revision graph. The second measure of the second metric attributed to the responsible entity is a measure of how many violations were introduced by the responsible entity compared to how many violations were introduced by any responsible entity and removed by the responsible entity. The request specifies a level of granularity for the responsible entities.

Particular embodiments of the subject matter described in this specification can be implemented so as to realize one or more of the following advantages. Interactive user presentations can provide valuable insight into the productivity and quality of people and groups of people contributing to a software development project. This information can be used to improve team performance and to help guide the selection of developers for various training programs and team assignments. This information also gives general insight into the software engineering process of the organization to which the developers belong. Team performance can further be improved by encouraging team members to reduce the number of violations that are introduced and to increase the number of violations that removed. Historical views illustrate the effects of management decisions, team compositions, and other factors on the quality of the code base.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for identifying violations of coding standards. In the systems described below, violations will be represented by data elements that will also be referred to simply as violations when the meaning is clear from context.

A static analysis system can use any appropriate set of coding standards for identifying violations, e.g., the NASA Jet Propulsion Laboratory Institutional Coding Standard for the Java Programming Language, available at http://lars-lab.jpl.nasa.gov/JPL_Coding_Standard_Java.pdf. The types of violations that a static analysis system can identify include correctness standards on coding concurrent processes, maintainability standards on eliminating duplicate code segments, readability standards on reducing code complexity, and framework standards on using code libraries, to name just a few examples.

In Table 1, below, is an example segment of source code that contains a violation, indicated by the underlined text. The line numbers are line numbers of an example source code file.

```
127 Set<String> revs;
 . . .
162 for (IRevision rev : new ArrayList<IRevision>(keep)) {
163    if (!revs.contains(rev)) {
 . . .
179    }
180 }
```

Table 1

On line 127, the variable "revs" is declared to be of type "Set<String>". In other words, "revs" is a set of data elements that are character strings. On line 162, the variable "rev" is declared to be of type "IRevision."

On line 163, the source code checks whether the IRevision element "rev" is contained in the string set "revs." This requires a comparison between data elements that are strings and data elements that are of type "IRevision." Thus, the check on line 163 violates a coding standard that comparisons must only performed between variables of the same type. In fact, the check on line 163 will likely always return "false," and thus must be corrected by a developer in order for the program to operate correctly.

A violation data element for a violation in a project can include data representing a snapshot, S, a location, l, and a violation type, t. The location l will specify the location of the source code that violates the applicable coding standard. The source code that violates the standard, which will be referred to as the "violation snippet," will generally be a contiguous segment of source code; however, in some cases, it may be two or more disconnected segments of source code, and the location l will specify all of the corresponding segments. Similarly, the source code will generally be found in one source code file, but may be found in two or more source code files.

The location l of a particular source code violation can be specified by a path of a source code file that includes the particular violation, as well as a start position and an end position of the violation snippet or, if the violation snippet includes multiple segments of source code, multiple start positions and end positions of the multiple segments within the file. Typically, the start and end positions within a file are represented by starting and ending line numbers within the file. The start and end positions may also specify an offset within the line, e.g., a column number or an offset that specifies a number of characters or bytes. For example, a violation data element representing the example violation illustrated above would have a violation snippet "revs.contains(rev)", and a location l that specifies a path of the example file, a beginning line 163 with beginning offset 10, and an ending line 163 with ending offset 28. The start and end positions can also be given by a byte offset within the file as a whole. Additionally, rather than an absolute end position, the end position could be specified as an offset from the start position of the violation.

A violation data element also has a type that indicates what sort of violation the violation is. For example, a violation representing the example violation illustrated above would have a type that indicates that the violation snippet violates a coding standard that forbids comparing data elements that have different types.

A system can also categorize violation types into one of several categories and can maintain a database that records to which category each identified violation belongs.

Example violation categories include maintainability violations, resource leak violations, concurrency violations, exception handling violations, and comparison violations, to name just a few examples.

A static analysis system can determine status changes of violations in one particular snapshot relative to another snapshot. In this specification, reference will be made to determining status changes of violations by comparison between a first snapshot S and a second snapshot T. The snapshot S may represent the source code files of the project at an earlier point in time than the snapshot T. The snapshot S and the snapshot T may also have a parent/child relationship in a revision graph. A first snapshot is a "parent" of a second snapshot when a commit of the first snapshot is a parent in the revision graph of a commit of the second snapshot. Similarly, a first snapshot is a "child" of a second snapshot when a commit of the first snapshot is a child in the revision graph of a commit of the second snapshot.

However, snapshots being compared need not have any particular relationship at all. In fact, the snapshot T may represent an earlier snapshot of the project than the snapshot S. The snapshot Sand the snapshot T may be illustrated as adjacent in a revision graph; however, this is not required.

Status changes include the introduction of violations that were introduced in the snapshot T relative to the snapshot S as well as the removal of violations that were removed from the snapshot S relative to the snapshot T. Violations that were introduced in the snapshot T relative to S are violations that occur in the snapshot T but do not occur in the snapshot S. Conversely, violations that were removed from the snapshot S relative to T are violations that occur in the snapshot S but do not occur in the snapshot T.

Two violations match each other if they refer to the same coding defect in their respective code bases. In other words, a violation v in a first snapshot S matches a violation iv in a second snapshot T if v refers to the same coding defect in the snapshot S as w does in the snapshot T. A static analysis system can determine which violations in S match those in T. Given a set V of violations in S, and a set W of violations in T, a static analysis system can determine a set M of violations in V that have a matching violation in W, and a set N of violations in W that have a matching violation in V. The static analysis system can further require that no two elements of M match the same violation in W, and that no two elements of N match the same violation in V. The static analysis system can also determine a set P of violations that occur in V but do not match any violation in W, and a second set Q of violations that occur in W but do not match any violation in V.

In a common situation where the snapshot S and the snapshot T are from the same code base and the snapshot S is a sole parent of the snapshot Tin a revision graph, the set M represents the set of violations in S that were uncorrected in the code base between the snapshots S and T; the set P represents the set of violations in S that were removed from the code base in snapshot T; and, the set Q represents the set of violations that were introduced into the code base in snapshot T.

In this specification, the term "matching violation" may be used to refer to a violation in a snapshot S, a violation in a snapshot T, or to a pair of matching violations in the snapshots S and T, as will be apparent from the context.

Because pairs of matching violations represent the same coding defect, pairs of matching violations have the same type. However, the matching violations of a pair may, but need not, have identical violation snippets. Similarly, matching violations of a pair may, but need not, occur at a same location within a file in the snapshot S and the snapshot T. Likewise, matching violations of a pair may, but need not, occur within a same file in the snapshot S and the snapshot T.

A static analysis system can attribute violation status changes to a particular responsible entity by identifying violations that do not match each other between two snapshots. In the case described above, when S is a sole parent of T, the removal of the violations in P and the introduction of the violations in Q could be attributed to a responsible entity, e.g., a developer or a team of developers, that committed the snapshot T. A "developer" in this context may actually refer to a group or team of developers responsible for the snapshot T.

Figure 1:
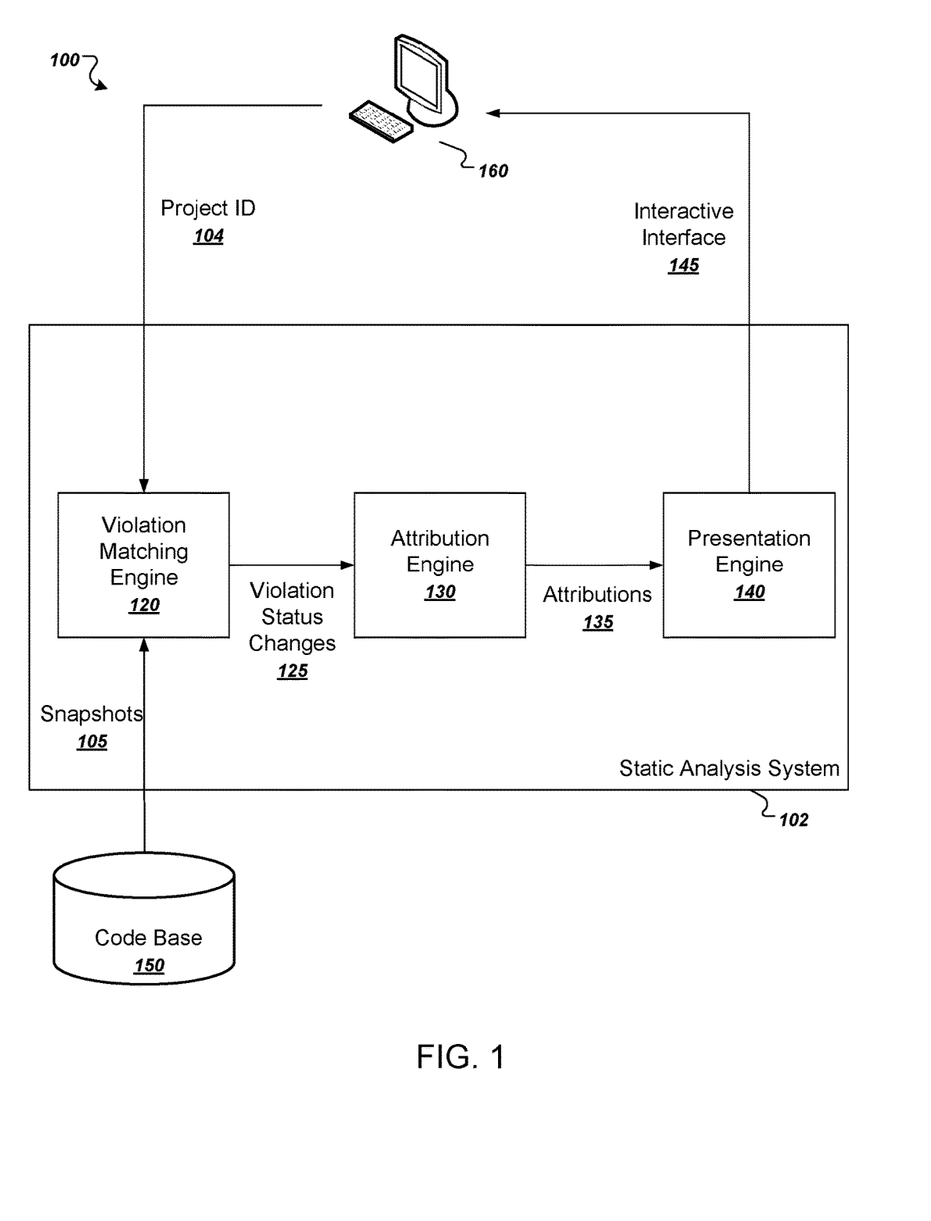
FIG. 1 illustrates an example system.

FIG. 1 illustrates an example system 100. The system 100 includes a user device 160 in communication with a static analysis system 102. The static analysis system 102 includes several functional components, including a violation matching engine 120, an attribution engine 130, and a presentation engine 140. The components of the static analysis system 102 can be implemented as computer programs installed on one or more computers in one or more locations that are coupled to each through a network.

A user of user device 160 can initiate static analysis of snapshots of the code base 150. The user device 160 can communicate with the static analysis system 102 over the network 170, which can be any appropriate communications network, e.g., an intranet or the Internet, or combination of them. For example, a user of user device 160 can specify a project identifier 104 of a project for analysis. Alternatively, the static analysis system 102 can be installed in whole or in part on the user device 160. The user of user device 160 can also communicate with the static analysis system 102 in order to specify or customize the coding standards that define coding defects.

Upon the user of user device 160 specifying the project identifier 104 for static analysis, the violation matching engine 110 receives the snapshots 105 from the code base 150 of the project.

The violation matching engine 120 generates data representing violations in the snapshots 105, or receives such data from other sources. The violation matching engine 120 determines which of the violations in the snapshots 105 are matching violations between adjacent snapshots S and T in a revision graph of the project. In other words, the violating matching engine 120 determines pairs of the violations that match between the snapshots.

The violation matching engine 120 then determines violation status changes 125. The violation status changes 125 include violations introduced and removed between snapshots of the revision graph, which are unmatched violations. In other words, for a snapshot S and a snapshot T that is a child of S, the violation status changes 125 are data representing the introduction of violations into a snapshot T relative to S and the removal of violations from the snapshot S relative to T.

The attribution engine 130 receives the violations status changes 125 from the violation matching engine 120 and attributes the violation status changes to a particular responsible entity.

Figure 2:
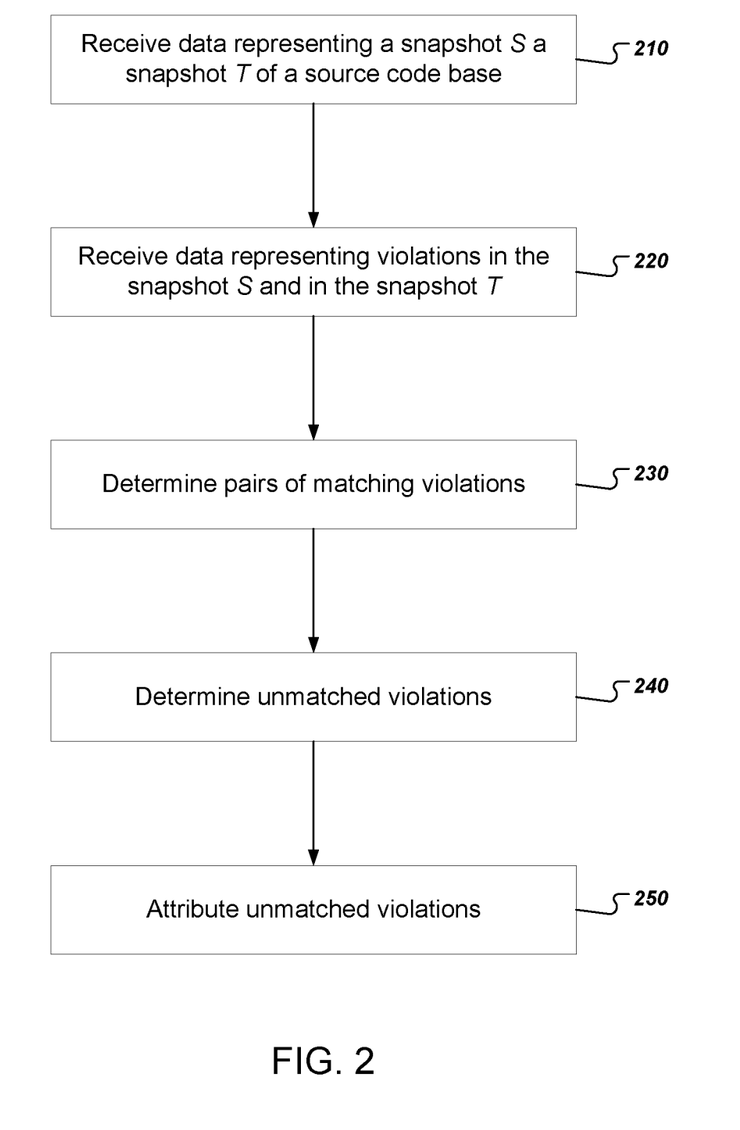
FIG. 2 is a flow chart of an example process for attributing violation status changes.

FIG. 2 is a flow chart of an example process for attributing violation status changes. The process can be implemented by one or more computer programs installed on one or more computers. The process will be described as being performed by an appropriately programmed system of one or more computers, e.g., the static analysis system 102 of FIG. 1.

In general, a static analysis system receives data identifying violations in a snapshot S and a snapshot T of a project. The system then determines matching violations and uses the matching violations to attribute violation status changes. Suitable techniques for matching violations and attributing violation status changes are described in more detail in commonly-owned U.S. patent Ser. No. 14/696,185, for "Source Code Violation Matching and Attribution," which is incorporated herein by reference.

The system receives data representing a snapshot S and a snapshot T of a code base (210). The data includes data representing paths of source code files in each snapshot. The data may, but need not, include all of the actual source code of each snapshot.

The data representing the snapshots can include data about which files of the snapshot S correspond to files of the snapshot T. For example, if some files from the snapshot S were moved to a new directory or simply renamed in the snapshot T, the data can include cross-reference data representing a correspondence of paths for files in the snapshot S and files in the snapshot T. Two files having corresponding paths can be referred to as files having "matching paths." In some implementations, the system by default considers files to correspond if they have a same path in the snapshot S and in the snapshot T.

The system receives data representing violations in the snapshot S and in the snapshot T (220). The data representing the violations includes, for each violation, data representing a snapshot, a location, and a type. The data also includes the violation snippet having source code that corresponds to the violation.

In some implementations, the system determines the violations by analyzing source code from the snapshot S and the snapshot T. However, the system may also receive the data representing the violations from another source, e.g., as uploaded by a user, or as generated by a separate static code analyzer.

The system determines pairs of matching violations (230), i.e., categorizes particular pairs of violations as matching each other. In general, the system can compare each violation in the snapshot S with each violation in the snapshot T having the same type using one or more matching tests to determine whether the violations are matching violations. Once a pair of violations are determined to be matching violations, the system need not subject the violations to additional tests and can remove the violations from consideration. In addition, the system performs some matching tests only on violations that occur in corresponding files in each snapshot.

The system determines unmatched violations (240), i.e., identifies violations that are not matching violations. The system determines both violations in the snapshot S that do not have a corresponding matching violation in the snapshot T as well as violations in the snapshot T that do not have a corresponding matching violation in the snapshot S. The unmatched violations are violations that correspond to a status change between the snapshot S and the snapshot T.

As shown in FIG. 2A, the system attributes the unmatched violations to a responsible entity (250). As described above, the unmatched violations in S may represent violations removed from the snapshot S, and the unmatched violations in T may represent violations introduced in the snapshot T.

The system can attribute a status change of an unmatched violation to a responsible entity. Typically, the system attributes status changes of violations to the responsible entity who committed the snapshot T to the version control system.

Figure 3:
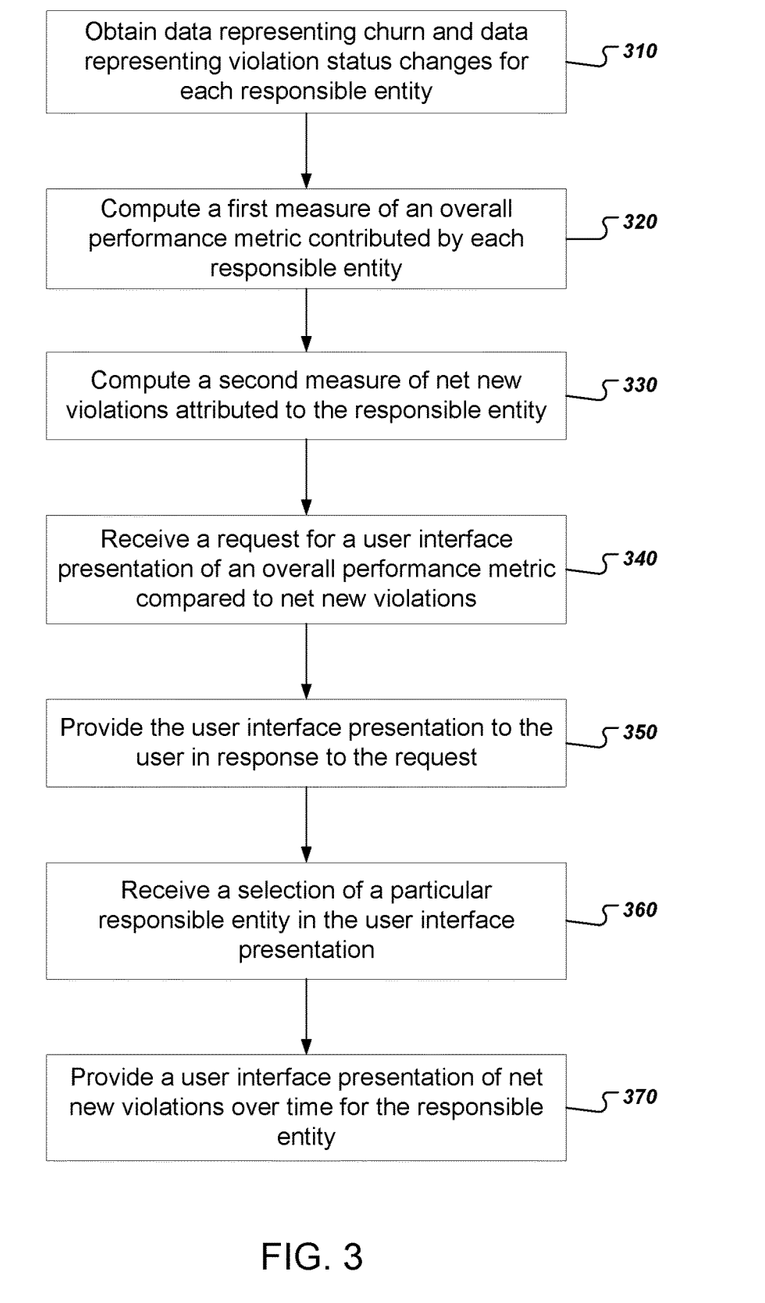
FIG. 3 is a flow chart of an example process for generating an interactive presentation of the performance of responsible entities in the system.

FIG. 3 is a flow chart of an example process for generating an interactive presentation of the performance of responsible entities in the system. The process will be described as being performed by an appropriate programmed system of one or more computers.

The system obtains data representing overall contributions and data representing violation status changes for each responsible entity (310). As described above, the responsible entities can represent individual developers, groups of developers, or both.

The obtained data can include incremental data representing overall contributions and violation status changes for each of multiple periods of time, which can be data compiled over any particular time period, or over all time periods, or one over all time. For example, a user may provide a request to evaluate responsible source code entities for a most recent month. In some implementations, the system obtains this data for each snapshot of the code base and uses the snapshots to represent the points in time.

In general, the overall performance metric for a responsible entity is a measure of the overall contributions by the responsible entity in the code base. There are a number of overall performance metrics that can be used, e.g., churn and net code additions.

Data representing churn can represent how many additions, deletions, or modifications were contributed by the responsible entity. Data representing net code additions can represent how many additions were contributed by a responsible entity.

The overall performance metric can be measured according to any unit of source code, e.g., source code elements, line of source code, source code files, or source code directories, to name just a few examples. For example, the churn data can include counts of lines of source code added, lines of source code deleted, and lines of source code modified by the responsible entity.

The data representing violation status changes for a responsible entity relate to violations introduced by the responsible entity and violations removed by the responsible entity. In general, a responsible entity can only introduce his or her own violations. However, a responsible entity may remove any violations that were introduced by the same responsible entity or another responsible entity.

The system computes a first measure of an overall performance metric contributed by each responsible entity (320). For example, the system can compute a series of measures of churn or net code additions for the responsible entity for each of the multiple time periods. The system can then use each of the computed measures of churn or net code additions to compute an aggregated value for the overall performance metric, e.g., a count of a number of lines of source code added, deleted, and modified by the responsible entity.

The system computes a second measure of net new violations attributed to the responsible entity (330). For each of the multiple time periods, the system can compare the violations introduced to the violations removed. For example, the system can subtract violations removed from violations introduced, which may result in a negative or positive value. In this example, a negative number generally represents a better source code developer. The system can then compute an aggregate measure of net new violations for the responsible entity.

In some implementations, when computing the first measure of the overall performance metric and the second measure of net new violations, the system can use transformed values rather than raw counts. For example, the system can transform the raw counts by normalizing or scaling the counts and using the transformed values rather than the raw counts of the overall performance metric and net new violations. The system may also give more weight to some violations than others. For example, very serious violations that tend to frequently result in run-time errors can be assigned more weight than other violations that are less serious.

The system receives a request for a user interface presentation of an overall performance metric compared to net new violations (340). The request can specify a particular project or subproject, in which case the presentation will display data relating to responsible entities that worked on the project or subproject. The request can also specify a particular team of multiple responsible entities or a department of an organization having multiple responsible entities, in which case the presentation will display data relating to one or more projects worked on by those responsible entities. The request can also specify a particular time period or multiple time periods, or any other appropriate parameter for selecting the overall performance metric and net new violation data.

The request can also specify a particular granularity for responsible entities that are to be displayed. For example, the request can specify that the responsible entities to be shown are individual developers, individual developer teams, or entire departments in an organization.

The request can also specify a particular category or type of violation that the user is interested in. For example, the user may specify that the user interface presentation should present data relating to violations that are categorized as maintainability violations.

The system provides the user interface presentation to the user in response to the request (350). The user interface presentation provides the user with a quick and intuitive view of source code developers that are productive and unproductive and source code developers that are better than others, according to the measures selected by the user.

Figure 4:
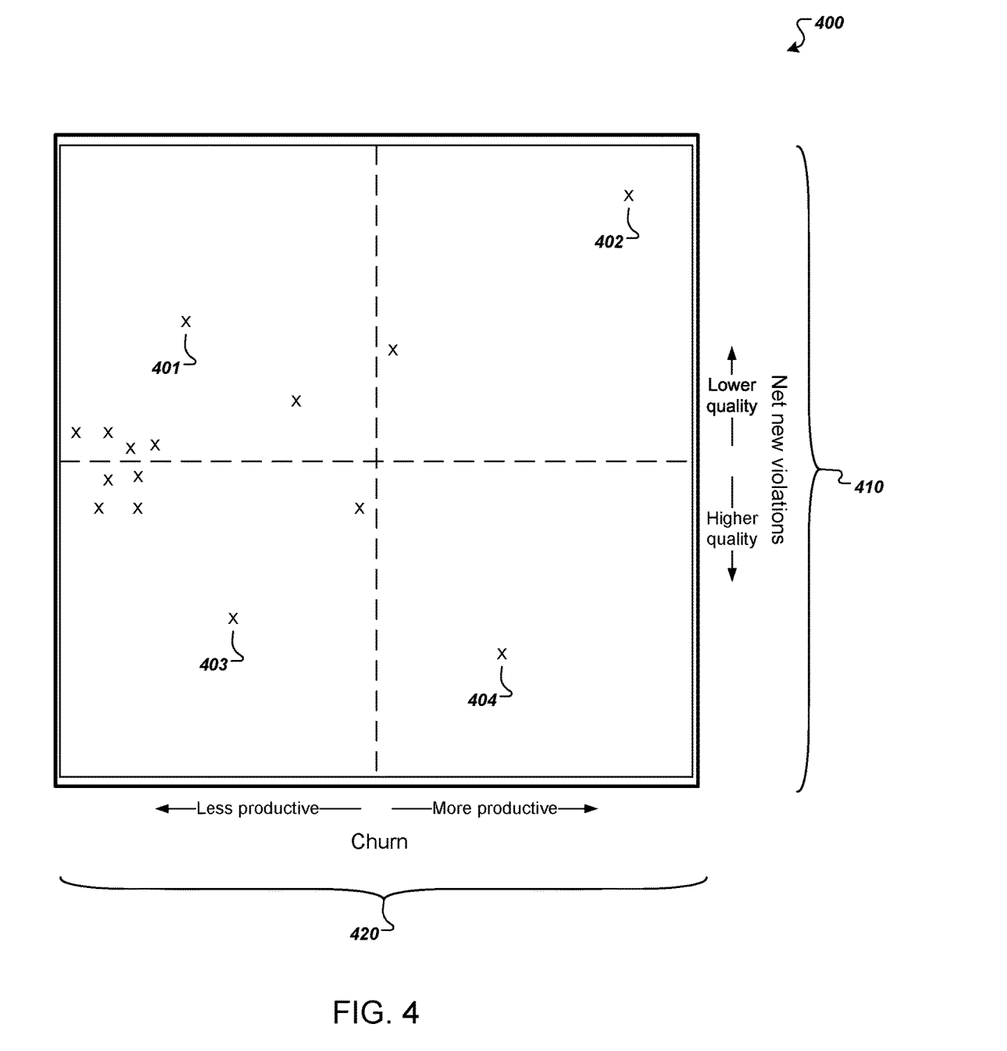
FIG. 4 illustrates an example presentation of churn compared to net new violations.

FIG. 4 illustrates an example presentation of churn compared to net new violations. The presentation 400 presents graphical elements representing respective responsible entities in a space having two dimensions.

A first axis 410 along a first dimension represents the quality of responsible entity contributions. The quality of contributions for a responsible entity is reflected in this presentation by the net new violations attributed to the responsible entity. In the example presentation 400, moving up in the presentation represents lower quality, while moving down in the presentation represents higher quality.

A second axis 420 along a second dimension represents the productivity of responsible entities. The productivity of a responsible entity is reflected in this presentation by the churn attributed to the responsible entity. In the example presentation 400, moving left represents less productivity, and moving right represents more productivity.

In some implementations, the directions for the axes 410 and 420 and the axes 410 and 420 themselves are swapped.

Each responsible entity is then presented in the two-dimensional space as a particular graphical element. The position of the graphical element has a first coordinate corresponding to the measure of net new violations for the responsible entity and a second coordinate corresponding to the measure of churn for the responsible entity.

These two axes naturally divide the two dimensional space into four portions, which may be quadrants of the space. The four portions are demarcated by the dotted lines in the figure. However, the presentation need not actually present such dotted lines.

An upper-right portion of the presentation 400 represents highly productive, but lower quality responsible entities. These responsible entities may produce source code quickly, but may not follow proper procedures or take the appropriate time to consider the source code being written. Thus, a team leader can use the example presentation 400 to target training for improving the quality of the contributions these responsible entities. A system may also automatically schedule training sessions for developers that fall into the upper-right portion. For example, the system can automatically schedule a training session for developer 402 in the upper-right quadrant.

A lower-right portion of the presentation 400 represents highly productive and higher quality responsible entities. These responsible entities produce high quality source code quickly. Thus, a team leader can use the example presentation 400 to identify, as developers to be rewarded, developers in the lower-right portion. A system may also automatically provide rewards, e.g., team recognition or bonuses, to responsible entities in the lower-right portion of the presentation 400.

An upper-left portion of the presentation 400 represents low productivity and low quality responsible entities. These responsible entities are not highly productive contributors and do not produce high-quality source code. Responsible entities in this portion are likely to be new employees or team members with less experience. Thus, a team leader can use the example presentation 400 to identify, as needing appropriate mentoring and training, responsible entities falling in the upper-left portion of the presentation 400. A system may also automatically schedule a training session for a responsible entity in the upper-left portion.

A lower-left portion of the presentation 400 represents low productivity, but higher quality responsible entities. These responsible entities are not highly productive contributors, but they produce high-quality source code. Responsible entities in this portion may be skilled employees who are experiencing personal issues or need more motivation, or who are working on difficult issues in small bodies of code.

A system can also use the portions into which developers fall to identify mentoring and team pairing opportunities. A highly productive developer can be selected to help or mentor a low productive developer. Likewise, a high-quality developer can help or mentor a low-quality developer. In general, the system will pair developers from opposite ends of one or both of the axes 410 and 420.

In some implementations, the system uses a violation type to suggest mentoring and team pairing opportunities. In other words, the system pairs developers based on data computed for the same violation type and not all violations generally. The system can, for example, use a violation type that was specified as part of the request.

The presentation 400 provides a user with an intuitive view of the performance of an entire team of responsible entities. The user can immediately spot outliers as shown by the presentation 400. For example, the responsible entity 401 is an unskilled and low-productivity developer. The responsible entity 402 is a highly productive developer, as measured by churn, but generates low-quality source code. The responsible entity 403 is highly skilled but is not highly productive. And the responsible entity 404 is highly productive and highly skilled developer.

In order to obtain more information about a particular responsible entity, a user can select one of the responsible entities plotted in the presentation 400.

As shown in FIG. 3, the system receives a selection of a particular responsible entity in the user interface presentation (360). In response to receiving the selection, the system provides a user interface presentation of net new violations over time for the responsible entity (370).

Figure 5A:
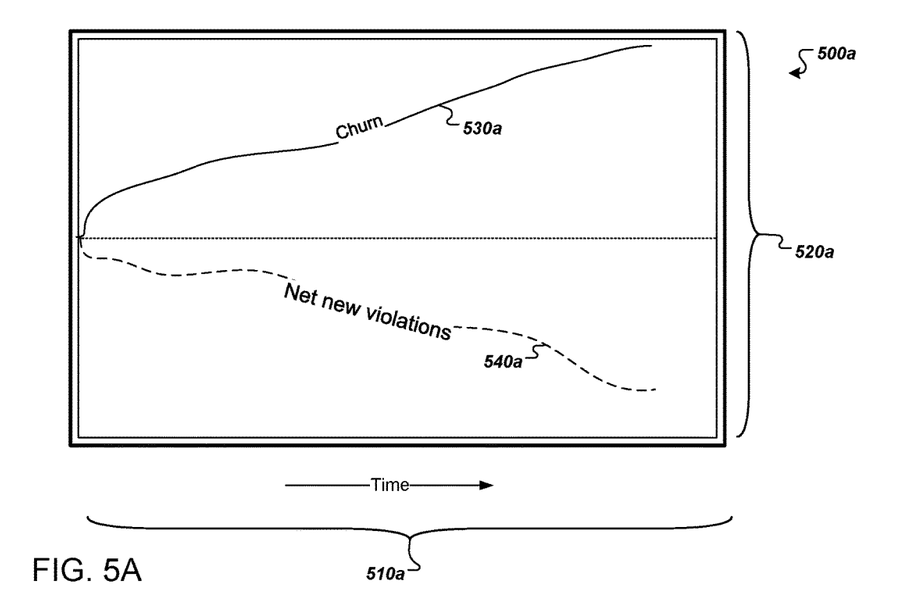
FIGS. 5A and 5B illustrate example user interface presentations and that display net new violations over time for a particular responsible entity.
Figure 5B:
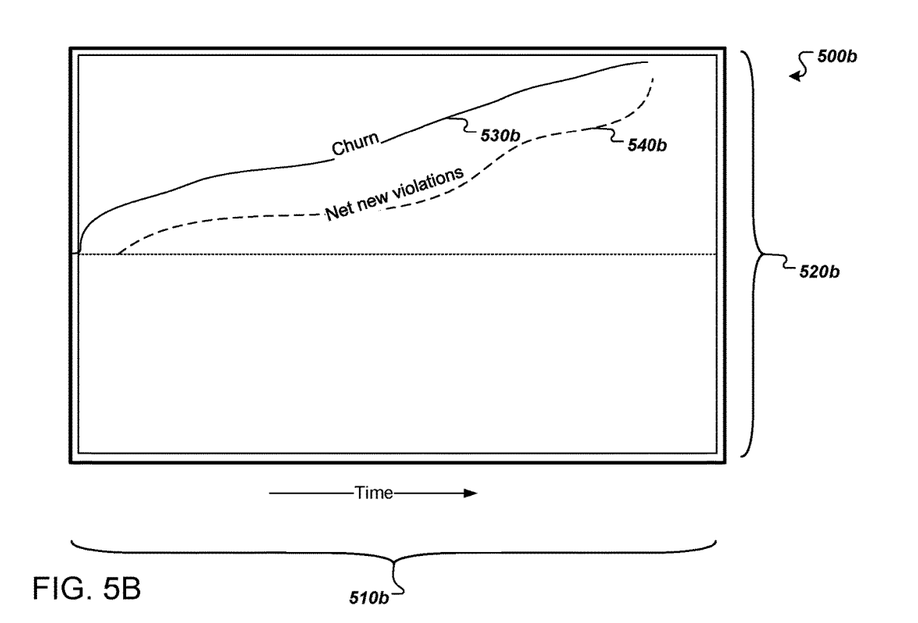

FIGS. 5A and 5B illustrate example user interface presentations 500a and 500b that display net new violations over time for a particular responsible entity.

In FIG. 5A, the presentation 500a presents net new violations over time as well as churn over time in a space having two dimensions. A first axis 510a along a first dimension represents time. A second axis 520a along a second dimension represents a measure of net new violations and a measure of churn for the responsible entity.

The presentation 500a presents a representation 530a of churn over time and a representation 540a of net new violations over time. In this example, the representations 530a and 540a are lines representing how the counts of churn and net new violations change over time. The representations 530a and 540a can also include individual data points for the measures of churn and net new violations for each of multiple time periods.

The representation 530a of churn over time and the representation 540a of net new violations over time can start at any appropriate reference point. For example, they can both start at zero, or they can both start at respective averages among team members.

In the example shown in FIG. 5A, as the responsible entity's measure of churn increases, the responsible entity's measure of net new violations decreases. This is a sign of a high-quality developer. In other words, the more that this developer works on the code base, the better the code base is getting in terms of coding defects in the code base.

In FIG. 5B, shows a presentation 500b corresponding to that of FIG. 5A, but for a different example responsible entity.

In the presentation 500b, the representation 540b of net new violations over time increases as the churn increases. This is a sign of a low-quality developer who may need more training and supervision. In other words, as this responsible entity works on the code base, the violations attributed to the responsible entity also increases.

In some implementations, the system can use the changes in the measures of churn and the measures of net new violations over time to determine a score for a particular developer.

Thus, by using the presentations 500a and 500b, a user can gain insight into what kind of a performer a particular responsible entity is. This data can be particularly helpful when presented for particular types of violations as it can further demonstrate the strengths or weaknesses of the developer.

The system can also automatically quantify the trends that that are displayed in FIGS. 5A and 5B. For example, the system can compute a first difference between churn and net new violations at the start of a particular time period and a second difference between churn and net new violations and the end of a particular time period.

FIG. 5A illustrates the situation where the first difference is small and the second difference is large. In this situation, the system would assign a high score to the responsible entity indicating that the responsible entity produces high quality source code.

FIG. 5B illustrates the situation where the first difference is small and the second difference is also small. In this situation, the system would assign a low score to the responsible entity indicating that the responsible entity produces low quality source code.

In some implementations, the system computes a score S for a responsible entity according to:

$$S=|(|c_1-v_1|-|c_2-v_2|)|,$$

where $c_1$ is the initial measure of churn, $c_2$ is a final measure of churn at the end of a particular time period, $v_1$ is an initial measure of net new violations, and $v_2$ is a final measure of net new violations at the end of the particular time period. The system can then rank responsible entities by their computed scores.

The system can also use the scores to categorize responsible entities. For example, if S is above a first threshold, the system can designate the responsible entity as a high quality developer. If S is below a second threshold, the system can designate the responsible entity as a low-quality developer. If S is neither above the first threshold nor below the second threshold, the system can designate the responsible entity as a normal developer.

The system can use the categorization of a responsible entity in the user interface presentations in various ways. For example, in the user interface presentation 400 shown in FIG. 4, the system can provide a visual indication, e.g., a color coded indication, of to which category a particular developer belongs. This information can be useful when the presentations shown in FIG. 4 and FIG. 5A-B do not correspond to the same time periods. For example, the presentation 400 may represent data from all time periods, while the presentation 500a may represent data only from a recent time period.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a user, a request for a first user interface presentation representing a first metric of overall performance compared to a second metric of net new violations attributed to each responsible entity of a plurality of responsible entities that contributed source code to a software project;
   obtaining data representing a respective amount of overall contributions contributed by each responsible entity of the plurality of responsible entities to the software project;
   obtaining data representing violation status changes for each responsible entity of the plurality of responsible entities;
   automatically computing, for each responsible entity of the plurality of responsible entities, a first measure of the first metric of overall performance contributed by the responsible entity of the plurality of responsible entities to the software project;
   automatically computing, for each responsible entity of the plurality of responsible entities, a second measure of the second metric of net new violations attributed to the responsible entity of the plurality of responsible entities;
   automatically generating the first user interface presentation, wherein each responsible entity of the plurality of responsible entities is represented by a graphical element at a position in a display area of the automatically generated first user interface presentation, and wherein the position of the graphical element in the display area of the automatically generated first user interface presentation includes one coordinate corresponding to the first measure of the first metric of overall performance contributed by the responsible entity of the plurality of responsible entities to the software project and another coordinate corresponding to the second measure of the second metric of net new violations attributed to the responsible entity of the plurality of responsible entities; and
   providing the automatically generated first user interface presentation for display to the user in response to the request for the first user interface presentation.

2. The computer-implemented method of claim 1, wherein the first metric of overall performance is churn contributed by the responsible entity of the plurality of responsible entities.

3. The computer-implemented method of claim 1, wherein the first metric of overall performance is net code additions by the responsible entity of the plurality of responsible entities.

4. The computer-implemented method of claim 1, wherein the second measure of the second metric of net new violations represents a difference between (i) how many violations were introduced into snapshots of the software project by the responsible entity of the plurality of responsible entities, and (ii) how many violations introduced by any responsible entity of the plurality of responsible entities were found in a first snapshot and removed by the responsible entity of the plurality of responsible entities in a second snapshot.

5. The computer-implemented method of claim 4, further comprising obtaining respective counts of violation status changes attributed to each responsible entity of the plurality of responsible entities that were contributed to the software project, and wherein a violation status change represents a violation introduction attributed to the responsible entity of the plurality of responsible entities or a violation removal attributed to the responsible entity of the plurality of responsible entities.

6. The computer-implemented method of claim 1, wherein upon receiving a user selection, within the automatically generated first user interface presentation, of a particular representation of a particular responsible entity of the plurality of responsible entities, displaying a second user interface presentation that displays net new violations over time.

7. The computer-implemented method of claim 6, wherein the second user interface presentation displays a relationship between (i) net new violations introduced over time, and (ii) overall contributions over time for the particular responsible entity of the plurality of responsible entities.

8. The computer-implemented method of claim 7, further comprising:
   receiving a user selection of the particular representation of the particular responsible entity of the plurality of responsible entities; and
   in response to receiving the user selection of the particular representation of the particular responsible entity of the plurality of responsible entities, automatically generating the second user interface presentation including displaying a first representation of overall contributions over time and a second representation of net new violations over time.

9. The computer-implemented method of claim 8, wherein the first representation of overall contributions over time and the second representation of net new violations introduced over time are aligned along a time axis.

10. The computer-implemented method of claim 1, wherein net new violations for a responsible entity of the plurality of responsible entities are total violation introductions attributed to the responsible entity of the plurality of responsible entities minus total violation removals attributed to the responsible entity of the plurality of responsible entities.

11. The computer-implemented method of claim 1, wherein violations removed are violations that occurred in a first snapshot committed by the responsible entity of the plurality of responsible entities that did not match any violations occurring in a subsequent snapshot of a revision graph.

12. The computer-implemented method of claim 1, wherein violations introduced are violations that occurred in a first snapshot committed by the responsible entity of the plurality of responsible entities that did not match any violations occurring in a preceding snapshot of a revision graph.

13. The computer-implemented method of claim 1, wherein the second measure of the second metric of net new violations attributed to the responsible entity of the plurality of responsible entities is a measure of how many violations were introduced by the responsible entity of the plurality of responsible entities compared to how many violations were introduced by any responsible entity of the plurality of responsible entities and removed by the responsible entity of the plurality of responsible entities.

14. The computer-implemented method of claim 1, wherein the request for the first user interface presentation specifies a level of granularity for the plurality of responsible entities.

15. A system comprising:
one or more computers and one or more storage devices storing instructions that are operable, when executed by the one or more computers, to cause the one or more computers to perform operations comprising:
receiving, from a user, a request for a first user interface presentation representing a first metric of overall performance compared to a second metric of net new violations attributed to each responsible entity of a plurality of responsible entities that contributed source code to a software project;
obtaining data representing a respective amount of overall contributions contributed by each responsible entity of the plurality of responsible entities to the software project;
obtaining data representing violation status changes for each responsible entity of the plurality of responsible entities;
automatically computing, for each responsible entity of the plurality of responsible entities, a first measure of the first metric of overall performance contributed by the responsible entity of the plurality of responsible entities to the software project;
automatically computing, for each responsible entity of the plurality of responsible entities, a second measure of the second metric of net new violations attributed to the responsible entity of the plurality of responsible entities;
automatically generating the first user interface presentation, wherein each responsible entity of the plurality of responsible entities is represented by a graphical element at a position in a display area of the automatically generated first user interface presentation, and wherein the position of the graphical element in the display area of the automatically generated first user interface presentation includes one coordinate corresponding to the first measure of the first metric of overall performance contributed by the responsible entity of the plurality of responsible entities to the software project and another coordinate corresponding to the second measure of the second metric of net new violations attributed to the responsible entity of the plurality of responsible entities; and
providing the automatically generated first user interface presentation for display to the user in response to the request for the first user interface presentation.

16. The system of claim 15, wherein the first metric of overall performance is churn contributed by the responsible entity of the plurality of responsible entities.

17. The system of claim 15, wherein the first metric of overall performance is net code additions by the responsible entity of the plurality of responsible entities.

18. The system of claim 15, wherein the second measure of the second metric of net new violations represents a difference between (i) how many violations were introduced into snapshots of the software project by the responsible entity of the plurality of responsible entities, and (ii) how many violations introduced by any responsible entity of the plurality of responsible entities were found in a first snapshot and removed by the responsible entity of the plurality of responsible entities in a second snapshot.

19. The system of claim 18, wherein the operations further comprise obtaining respective counts of violation status changes attributed to each responsible entity of the plurality of responsible entities that were contributed to the software project, and wherein a violation status change represents a violation introduction attributed to the responsible entity of the plurality of responsible entities or a violation removal attributed to the responsible entity of the plurality of responsible entities.

20. The system of claim 15, wherein upon receiving a user selection, within the automatically generated first user interface presentation, of a particular representation of a particular responsible entity of the plurality of responsible entities, displaying a second user interface presentation that displays net new violations over time.

21. The system of claim 20, wherein the second user interface presentation displays a relationship between (i) net new violations introduced over time, and (ii) overall contributions over time for the particular responsible entity of the plurality of responsible entities.

22. The system of claim 21, wherein the operations further comprise:
receiving a user selection of the particular representation of the particular responsible entity of the plurality of responsible entities; and
in response to receiving the user selection of the particular representation of the particular responsible entity of the plurality of responsible entities, automatically generating the second user interface presentation including displaying a first representation of overall contributions over time and a second representation of net new violations over time.

23. The system of claim 22, wherein the first representation of overall contributions over time and the second representation of net new violations introduced over time are aligned along a time axis.

24. The system of claim 15, wherein net new violations for a responsible entity of the plurality of responsible entities are total violation introductions attributed to the responsible entity of the plurality of responsible entities minus total violation removals attributed to the responsible entity of the plurality of responsible entities.

25. The system of claim 15, wherein violations removed are violations that occurred in a first snapshot committed by the responsible entity of the plurality of responsible entities that did not match any violations occurring in a subsequent snapshot of a revision graph.

26. The system of claim 15, wherein violations introduced are violations that occurred in a first snapshot committed by the responsible entity of the plurality of responsible entities that did not match any violations occurring in a preceding snapshot of a revision graph.

27. The system of claim 15, wherein the second measure of the second metric of net new violations attributed to the responsible entity of the plurality of responsible entities is a measure of how many violations were introduced by the responsible entity of the plurality of responsible entities compared to how many violations were introduced by any responsible entity of the plurality of responsible entities and removed by the responsible entity of the plurality of responsible entities.

28. The system of claim 15, wherein the request for the first user interface presentation specifies a level of granularity for the plurality of responsible entities.

29. A computer program product, encoded on one or more non-transitory computer storage media, comprising instructions that, when executed by one or more computers, cause the one or more computers to perform operations comprising:
- receiving, from a user, a request for a first user interface presentation representing a first metric of overall performance compared to a second metric of net new violations attributed to each responsible entity of a plurality of responsible entities that contributed source code to a software project;
- obtaining data representing a respective amount of overall contributions contributed by each responsible entity of the plurality of responsible entities to the software project;
- obtaining data representing violation status changes for each responsible entity of the plurality of responsible entities;
- automatically computing, for each responsible entity of the plurality of responsible entities, a first measure of the first metric of overall performance contributed by the responsible entity of the plurality of responsible entities to the software project;
- automatically computing, for each responsible entity of the plurality of responsible entities, a second measure of the second metric of net new violations attributed to the responsible entity of the plurality of responsible entities;
- automatically generating the first user interface presentation, wherein each responsible entity of the plurality of responsible entities is represented by a graphical element at a position in a display area of the automatically generated first user interface presentation, and wherein the position of the graphical element in the display area of the automatically generated first user interface presentation includes one coordinate corresponding to the first measure of the first metric of overall performance contributed by the responsible entity of the plurality of responsible entities to the software project and another coordinate corresponding to the second measure of the second metric of net new violations attributed to the responsible entity of the plurality of responsible entities; and
- providing the automatically generated first user interface presentation for display to the user in response to the request for the first user interface presentation.

* * * * *